2,931,703
PROCESS FOR RECOVERY OF LITHIUM HYDROXIDE FROM LITHIUM PHOSPHATES

Lawrence J. Reader, Malvern, Pa., assignor to Foote Mineral Company, Philadelphia, Pa., a corporation of Pennsylvania No Drawing. Application April 3, 1957
Serial No. 650,307

13 Claims. (Cl. 23—25)

This invention relates to lithium hydroxide recovery, and more particularly, provides a method for the recovery of lithium values in the form of lithium hydroxide from a lithium phosphate.

It is a principal object of the present invention to provide a novel method for the recovery of lithium values from a lithium phosphate.

It is a further object of this invention to provide a novel method for obtaining an alkali metal hydroxide from an alkali metal phosphate wherein lithium is one of the cations of the phosphate.

It is an additional object of this invention to provide a novel process for producing lithium hydroxide.

A further object of this invention is to provide a novel process of producing lithium hydroxide from a lithium phosphate in which losses of lithium are reduced to a minimum.

A specific object of this invention is to provide a novel method for the conversion of a lithium phosphate to lithium hydroxide with accompanying production of valuable byproducts.

These and other objects of the invention will be apparent from a consideration of the following specification and claims.

Alkali metal phosphates containing lithium as a cation are obtained as a byproduct or intermediate in many mineral refining processes. Commercially, lithium phosphate has no ready market, and for sale, is converted to other forms of lithium compounds such as lithium hydroxide. The methods proposed in the prior are for the release of the lithium values from a lithium phosphate generally do not lead directly to the formation of lithium hydroxide, but produce lithium salts such as lithium sulphate or lithium chloride, from which lithium hydroxide or lithium carbonate can be obtained only by proceeding through an additional step. The reaction of lithium phosphate with calcium hydroxide in aqueous solution, which does produce lithium hydroxide as a product, is commercially impractical because of an unfavorable solubility balance and low yields.

In accordance with the present process, lithium hydroxide is obtained by calcining a lithium phosphate with lime and alumina, followed by digestion of the calcined mass in water in the presence of lime.

Practically complete (over 90%) recovery of the lithium in the lithium phosphate may be obtained by operating in accordance with the process of the invention, and as a byproduct of the present reaction, there are obtained calcium salts useful in the ceramics and glass industries and also useful, for example, as a fertilizer.

The present process is applicable to the recovery of lithium hydroxide from a variety of alkali metal phosphates wherein at least one of the cations of the phosphate is lithium. The presently useful alkali metal phosphates may be represented by the general formula $LiMNPO_4$ where each of M and N is an alkali metal. The alkali metal represented by each of M and N may be lithium, sodium, potassium, rubidium or caesium; preferably, M and N are low molecular weight alkali metals, such as lithium or sodium. Particularly preferred as starting materials for the process of the invention are alkali metal phosphates containing at least two lithium cations, of the formula $Li_2MPO_4$ where M is as defined above.

One preferred source of lithium for processing in accordance with the present invention is $Li_3PO_4$. Trilithium phosphate, which may be converted to lithium hydroxide as further described hereinbelow, may be obtained, for example, from caustic liquors produced in processing ores such as spodumene, lepidolite, petolite, and the like, by treatment with phosphoric acid, whereby lithium values are conveniently separated from other alkali metal compounds admixed therewith.

Another alkali metal phosphate readily amenable to conversion to lithium hydroxide by the present process and employed in a preferred embodiment of this invention is dilithium sodium phosphate, $Li_2NaPO_4$, an impure form of which is a byproduct material from Searles Lake brines sometimes deignated as "Trona Scale." If desired, other dilithium alkali metal phosphates, such as $Li_2KPO_4$ or $Li_2RbPO_4$, may be utilized in the process of the invention. The monolithium alkali metal phosphates, exemplified by $LiNa_2PO_4$, $LiK_2PO_4$ and $LiCs_2PO_4$, when available, may alternatively be employed in accordance with this process, or mixtures of lithium phosphates may be used.

In the first step of the present process, the lithium phosphate is calcined with alumina and lime. The latter two reagents may be added as such, or in the form of materials supplying or giving rise to the desired compounds on heating. Thus, for example, the source of alumina may be any desired aluminum compound furnishing alumina at elevated temperatures, such as aluminum hydroxide; a particularly preferred and inexpensive source of alumina is an aluminum ore such as bauxite. The lime, or CaO, may be supplied by quicklime or hydrated lime, if desired, or advantageously, limestone or other form of calcium carbonate may be employed as a source of lime under the reaction conditions.

The reactions believed to be taking place on calcination and digestion of a lithium phosphate in accordance with the process of the invention, as illustrated with reference to $Li_3PO_4$, $Al_2O_3$ and $CaO$ as reactants, are as follows:

(1) Calcination

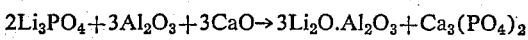
$$2Li_3PO_4 + 3Al_2O_3 + 3CaO \rightarrow 3Li_2O \cdot Al_2O_3 + Ca_3(PO_4)_2$$

(2) Digestion

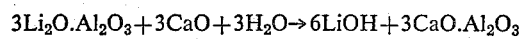
$$3Li_2O \cdot Al_2O_3 + 3CaO + 3H_2O \rightarrow 6LiOH + 3CaO \cdot Al_2O_3$$

When a mixed alkali metal phosphate of lithium is employed as a starting material, the reactants interact in the same proportions as in the above equations, but the corresponding alkali metal hydroxide is formed together with the lithium hydroxide. Thus, the overall reaction may be represented by the general equation

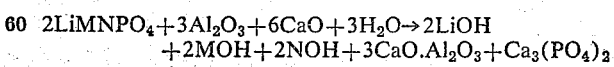
$$2LiMNPO_4 + 3Al_2O_3 + 6CaO + 3H_2O \rightarrow 2LiOH$$
$$+ 2MOH + 2NOH + 3CaO \cdot Al_2O_3 + Ca_3(PO_4)_2$$

where M and N are lithium or other alkali metal, as defined above.

As will be evident from the above equations, the lithium phosphate, alumina and lime are consumed in the process in the molar proportions respectively of 2:3:6, three moles of the lime being consumed in the calcination step and and three in the subsequent digestion. The total quantity of lime or source of lime required for the overall reaction is preferably added to the lithium phosphate prior to the calcination step, thus allowing for the conversion of a source of lime such as limestone into lime by the heat of calcination. However, the lime required for the digestion step may, if desired, be added to the product of the calcination step before digestion.

The exact ratios of the reactants are not critical. The phosphate-alumina-lime overall proportions, that is, the proportions in the calcination and digestion steps considered together, may be as low as 2:2:4, but in this case not enough lime and alumina will be present to produce complete conversion of the phosphate to the hydroxide, and yields will be correspondingly lowered. Accordingly, the overall proportions are preferably at least the theoretical molar proportions referred to above. Advantageously, lime and alumina are employed somewhat in excess of the theoretical requirements, so as to ensure maximum recovery of the lithium. Thus, for example, the overall phosphate-alumina-lime ratio may range up to about 1:2:6, if desired.

As noted above, the calcination charge need not contain all the lime required by the overall reaction, since additional lime may be added to the calcination product prior to digestion to remedy any deficiency thereof with respect to the reaction occurring in the latter step. Thus, in the calcination, the phosphate-alumina-lime proportions may if desired be as low as 2:2:2, although preferably the proportions will in general be at least the theoretical molar ratio shown in the first equation above, 2:3:3, and desirably the alumina and lime will exceed the minimum theoretical requirements, to produce proportions up to 2:4:6 or more. In the subsequent digestion step, the ratio of lithium aluminate in the calcination product to the lime present, either as a component of the calcination product or as a separately added reactant, may range from proportions of 3:2 to 3:6; advantageously, sufficient lime will be present to supply at least the theoretically required ratio, 3:3.

In preparing the calcination mixture, the lithium phosphate is mixed with the sources of alumina and lime in proportions to supply the desired molar ratio of reactants. When a surce of alumina such as aluminum hydroxide is utilized, this will obviously require 6 moles of the aluminum hydroxide for each 2 moles of phosphate, to allow for the production of 3 moles of alumina per mole of lithium phosphate on heating; and similarly, the amount of, for example, limestone used will be adjusted in accordance with the quantity of lime supplied thereby. Sufficient lime should also be employed to satisfy additional reactive materials associated with the reactants. For example, when bauxite is used as the source of alumina, each mole of $SiO_2$ associated therewith consumes two moles of CaO.

To effect the first step of the present process, the reactants are mixed together and calcined. Preferably, the ingredients are utilized in a finely-divided condition. If desired, the lithium phosphate, source of alumina and source of lime may be mixed before grinding and pulverized together, which results in an intimate admixture of the ingredients. The calcination of the mixture may be carried out in any of the well-known types of kilns or furnaces. The degree of heat and length of time required will depend on the fineness of the grind, the size of the charge, the type of furnace used and other factors. The temperature used should be at least high enough to allow formation of alumina and lime from the respective sources thereof and high enough so that reaction of the components of the mixture occurs. Generally temperatures in the range of about 1600 to 2500° F. are operable and temperatures between about 1800° F. and about 2300° F. are preferable. Reaction may be complete in times as short as about one half-hour or less, or it may require several hours, depending on the size of the furnace charge and other considerations.

The calcined mass is then digested with water in the presence of lime. Preferably the product obtained from the calcination step is ground prior to digestion in order to minimize contact time with the water. If the product from calcination does not contain the desired amount of lime, additional lime may be added and mixed with the calcined material. The lime-containing calcined material is then digested in water, advantageously with stirring, until a solution of lithium hydroxide is obtained. If desired, the entire calcined mass can be stirred with water in a batch-type operation until the alkali has been extracted therefrom, or alternatively, the digestion may be carried out in leaching tanks whereby the alkali is extracted in successive washings; the aqueous extracts from succeeding stages may be utilized for the digestion of the calcined mass in a multistage countercurrent procedure.

The temperature in the digestion step is advantageously elevated to accelerate the reaction. Temperatures as low as 60° C. are operable; temperatures in the range of from about 85° C. to about 95° C. are preferred. If desired, temperatures above 100° C., even up to about 115° C. can be used, due allowance being made for loss of water by evaporation, or with prevention of the loss of water by application of superatmospheric pressures.

The lithium hydroxide is obtained in aqueous solution as the liquor from the digestion step. This liquor may be separated, for example, by filtration or decantation and employed as such, or evaporated to precipitate lithium hydroxide. If the lithium phosphate starting material is a mixed alkali metal phosphate, the digestion liquor will be a caustic solution containing the hydroxides of lithium and the other alkali metal forming the cations of the original phosphate. The lithium hydroxide may then be separated from the admixture by conventional procedures; for example, by evaporating the digestion liquor to concentrate it, whereupon lithium hydroxide is precipitated out by virtue of its low solubility.

The residue from the digestion, containing calcium phosphate and calcium aluminate, is a valuable source of minerals of utility in the glass and ceramics industries and as a fertilizer. If desired, the digestion residue may be treated by conventional methods for the recovery of aluminum and phosphate values, or alternatively, the residue may be dried and ground for use in applications requiring the calcium compounds contained therein.

The invention is further illustrated but not limited by the following examples:

Example 1

This example illustrates the low yields of lithium hydroxide obtained when a lithium phosphate is calcined and digested with lime in the absence of alumina.

In separate, parallel test procedures, mixtures of lithium phosphate with lime (2½ times theory for the equation $6Li_3PO_4 + 4CaO \rightarrow 2Ca_2(PO_4)_3 + 9Li_2O$) were calcined for one hour at 1800° F. and at 2100° F., respectively. Digestion of these calcined products for 16 hours in water at 95° C. gave yields of less than 10% of the lithia as lithium hydroxide in each case.

Example 2

This example illustrates the superior results obtained on treating a mixture of lithium phosphate with lime and a source of alumina in accordance with the process of this invention.

To 20 parts by weight of a previously prepared mixture of 21 parts by weight of trilithium phosphate with 43 parts by weight of aluminum hydroxide was added 60 parts by weight of calcium carbonate, and the resulting mixture was calcined for 2 hours at 2200° F. The calcination product was finely ground and then digested in water at 95° C. for 4 hours. Assay of the liquor from the digestion showed that 98% of the lithia had been recovered as lithium hydroxide in solution.

Example 3

This example illustrates the process of the invention utilizing an alumina ore in the calcination.

A mixture of trilithium phosphate with a commercial grade of bauxite (10% excess of theory) and commercial lime (1.66 times theory) was calcined at 2200° F. for one hour. On digestion of the ground product in water at 95° C. for 4 hours, 64% of the lithia was recovered; a 94.8% yield of the lithia was obtained by a 16 hour digestion, as determined by assay of the digestion residue.

Example 4

This example illustrates the process of the invention as applied to a mixed alkali metal phosphate of lithium.

The dilithium sodium phosphate employed in this example, analyzing for 21.4% $Li_2O$, 23.6% $Na_2O$, and 53.2% $P_2O_5$, was identified as "Trona Scale." To 13.2 parts by weight of this dilithium sodium phosphate were added 30 parts by weight of bauxite (60.0% $Al_2O_3$, 14.5% $SiO_2$) and 72 parts by weight of limestone (98% $CaCO_3$). The mixture was calcined for one hour at 2100° F., and the calcined product was ground and digested in 6 parts by weight of water per weight of calcined product for 16 hours at 95° C. It was found that 85% of the lithia present in the original phosphate salt had been recovered in the digestion liquor as lithium hydroxide.

Similar results are obtained when the process is carried out in the same fashion, but the mixture of phosphate, alumina and lime sources is calcined at 2200° F.

By treatment of $LiKNaPO_4$ in accordance with the present process, lithium hydroxide is similarly recovered.

It is obvious that in recovering lithium hydroxide by the present process, it is possible to convert phosphates of lithium economically to a more readily saleable compound of lithium, and that the phosphates may be equally well utilized whether they contain only lithium or represent a mixed phosphate wherein a plurality of alkali metal cations, including lithium, are present. Furthermore, it is evident that the agents used in the process are readily obtainable in any desired quantity at low cost, and the use of expensive chemicals in any step of the process is avoided. It is further obvious that a process has been devised for the recovery of lithium hydroxide from phosphates thereof in which a residue in the form of a valuable byproduct is obtained, and thus the entire cost of the recovery of lithium hydroxide is not borne exclusively by the latter.

While the invention has been described with particular reference to various preferred embodiments thereof, it will be appreciated that modifications and variations can be made within the scope of the invention.

What is claimed is:

1. The process for the recovery of lithium values from an alkali metal phosphate which comprises calcining a lithium phosphate of the formula $LiMNPO_4$ where each of M and N is an alkali metal with added alumina and lime in a molar ratio of at least 2:2:2 and then digesting the resulting calcination product with water in the presence of lime, thereby forming an aqueous solution of lithium hydroxide as the digestion liquor.

2. The process for the recovery of lithium values from an alkali metal phosphate wherein at least one cation of the said phosphate is lithium, of the formula $LiMNPO_4$ where each of M and N is an alkali metal, which comprises heating said alkali metal phosphate with added alumina and lime in a molar ratio of at least 2:2:2 at 1600 to 2500° F., digesting the resulting calcination product with water in the presence of lime, and recovering lithium hydroxide from the digestion liquor.

3. The process of claim 2 wherein said heating is carried out at from about 1800° to about 2300° F.

4. The process of claim 3, wherein the said lithium phosphate is a phosphate, the cations of which are low molecular weight alkali metals selected from the group consisting of lithium and sodium.

5. The process of claim 4 wherein the said lithium phosphate is $Li_3PO_4$.

6. The process of claim 4, wherein the said lithium phosphate is a mixed alkali metal phosphate.

7. The process of claim 6, wherein the said lithium phosphate is a dilithium sodium phosphate.

8. The process for the recovery of lithium values from an alkali metal phosphate wherein at least one of the cations of said phosphate is lithium, of the formula $LiMNPO_4$ where each of M and N is an alkali metal, which comprises calcining a mixture of said alkali metal phosphate with added alumina and lime in molar proportions respectively within the range of from about 1:1:2 up to about 1:2:6; digesting the resulting calcination product with water, said digestion being carried out in the presence of lime; and recovering lithium hydroxide from the digestion liquor.

9. The method of claim 8 wherein the resulting product of calcination is digested with hot water, at a temperature of from about 60° C. to about 115° C., until substantially all the lithia contained therein is recovered as lithium hydroxide in aqueous solution.

10. The process of claim 8 wherein the lithium phosphate is heated with bauxite as a source of alumina.

11. The process of claim 8 wherein the said phosphate is heated with limestone as a source of lime.

12. The process for the recovery of lithium values from trilithium phosphate consisting of the steps of intimately mixing comminuted trilithium phosphate with a calcium-containing material that yields calcium oxide at least in part on heating and an aluminum-containing material that yields alumina at least in part on heating, in proportion to produce a molar ratio of $Li_3PO_4:CaO:Al_2O_3$ of at least about 2:2:2; heating said mixture at from 1800 to 2300° F. for at least about one-half hour; comminuting the resulting product of calcination; digesting said product of calcination with hot water at a temperature of from about 60° C. to about 115° C. in the presence of lime until said product is substantially free of alkali metal values; and separating the digestion liquor from the insoluble residue.

13. The process for the recovery of lithium values from dilithium sodium phosphate comprising the steps of intimately mixing comminuted dilithium sodium phosphate with a calcium-containing material that yields calcium oxide at least in part on heating and aluminum-containing material that yields alumina at least in part on heating in proportion to produce a molar ratio of $$Li_2NaPO_4:CaO:Al_2O_3$$

of at least 2:2:2; heating said mixture at from 1800 to 2300° F. for at least one-half hour; comminuting the resulting product of calcination; digesting said product of calcination with hot water at a temperature of from about 60° C. to about 115° C. in the presence of lime until said product is substantially free of alkali metal values; and separating the digestion liquor from the insoluble residue.

References Cited in the file of this patent

UNITED STATES PATENTS

| | | |
|---|---|---|
| 2,424,512 | Stauffer | July 22, 1947 |
| 2,548,037 | Minnick et al. | Apr. 10, 1951 |
| 2,776,201 | Mazza | Jan. 1, 1957 |